Figure 1:
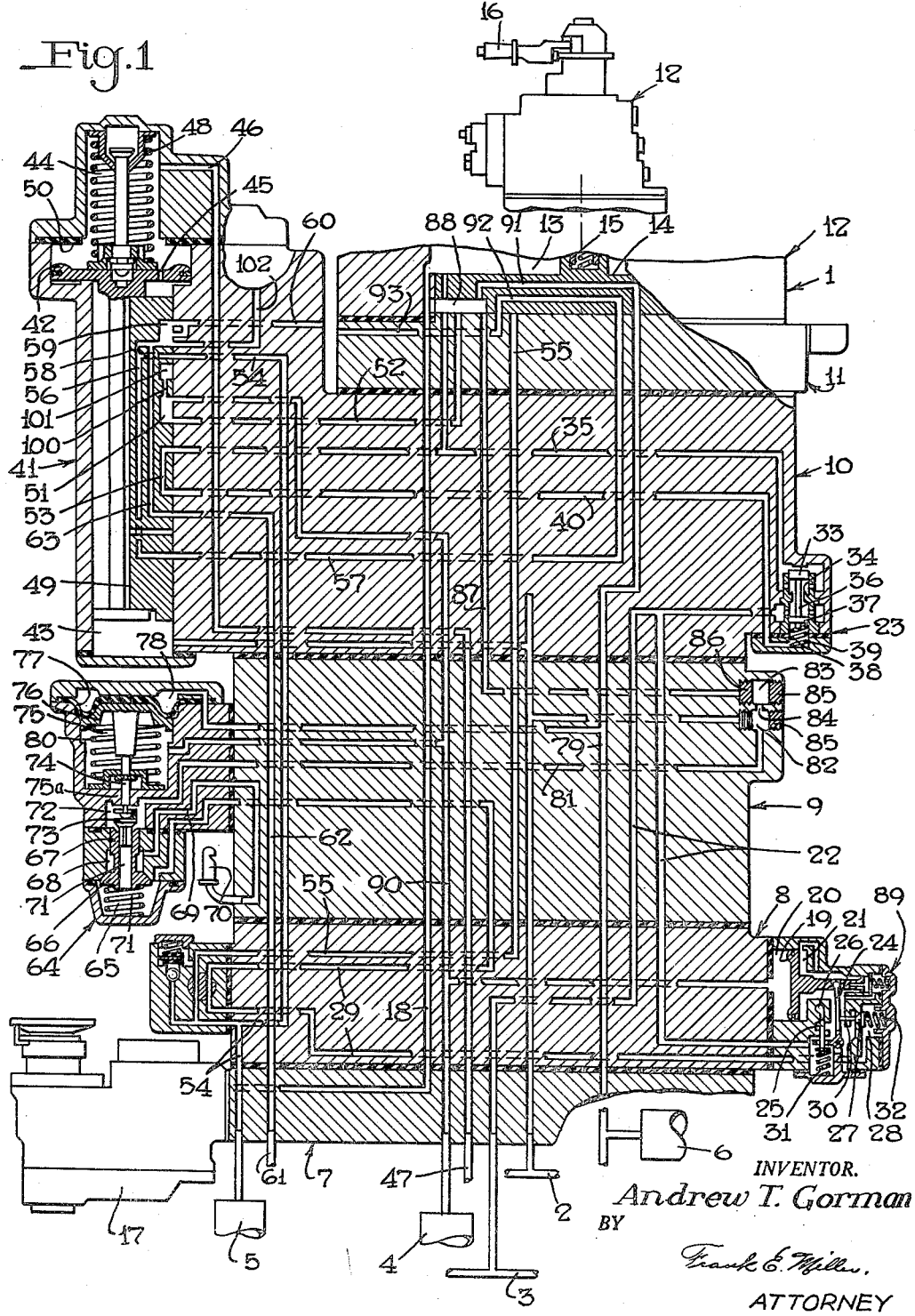

June 28, 1955  A. T. GORMAN  2,711,933
FLUID PRESSURE BRAKE APPARATUS
Filed Feb. 28, 1951  2 Sheets-Sheet 2

INVENTOR.
Andrew T. Gorman
BY
Frank E. Miller,
ATTORNEY

United States Patent Office 2,711,933
Patented June 28, 1955

2,711,933
FLUID PRESSURE BRAKE APPARATUS

Andrew T. Gorman, Pitcairn, Pa., assignor to Westinghouse Air Brake Company, a corporation of Pennsylvania Application February 28, 1951, Serial No. 213,094

13 Claims. (Cl. 303—60)

This invention relates to fluid pressure brakes and more particularly to the type employed on railroad locomotives.

In handling long freight trains down grades it has been customary to cycle the brakes, that is, to effect an application of brakes to a desired degree and then after leakage of fluid under pressure from the brake pipe had caused the degree of application to increase an undesirable amount, to recharge the brake system on the train during which time the brakes would release down to the setting of the usual pressure retaining valve devices on the cars. After the train brake system was sufficiently recharged a reapplication of the train brakes would be effected and such cycle of release and reapplication would then be continued as necessary until the bottom of the grade was reached. This type of control would of necessity provide a varying degree of train braking and hence of train speed, required a large amount of compressed air for each recharging operation, and further, if sufficient recharge of the brake system were not always obtained a gradual depletion of train charge could result with eventual inadequate braking to hold the train and a run-away and possible wrecking of the train would result.

With the AB brake equipment now in use on cars in freight service leakage in the equipment generally is of an inconsequential amount, but leakage from the brake pipe, in spite of good maintenance, can not be adequately controlled. A train conditioned to start a run with brake pipe leakage at a minimum may develop severe leakage upon stretching of the train, gathering of train slack, going around a curve or while operating at low atmospheric temperature. It will be apparent that if it were not for such brake pipe leakage, cycling on a grade could be substantially dispensed with. After having effected an application of brakes on a train, it has therefore been proposed to supply air to the brake pipe to compensate for leakage of fluid under pressure therefrom so as to hold the brake pipe pressure constant at the degree to which it was reduced to effect said application of brakes. In this way upon starting the descent of a grade a brake application sufficient to provide a desired braking of the train can be effected and it will remain substantially constant as long as desired. If the steepness of the grade increases or for some other reason it is deemed necessary to increase the degree of brake application this may be done and the increased application will then remain fixed. It is, of course, understood that if conditions require a decrease in the degree of brake application, the application in effect will have to be released and then the brakes reapplied to the desired reduced degree. It will, however, be noted that cycling due to brake pipe leakage could be eliminated by compensating for such leakage.

One object of the invention is the provision of improved means for accomplishing the above result by supplying fluid under pressure to the brake pipe to compensate for leakage after effecting an application of brakes. By such supply of fluid under pressure to the brake pipe, the pressure in the brake pipe will remain constant at any desired reduced degree, as will be apparent, this feature being hereinafter referred to as flat maintaining.

Cycling of brakes on a grade demands constant vigilance and expert control of a train brake system in order to avoid undue dissipation of the fluid under pressure in the system. With the use of flat maintaining such vigilance and expertness of control will not be required so there results the possibility that, due to successive reductions in brake pipe pressure, as may be necessary to provide increasing degree of brake application, an engineer may, without realizing it, end up without sufficient pressure remaining in the system to increase the degree of a brake application or even hold that which he may have as necessary to insure the safety of the train.

Another object of the invention therefore is to provide means for automatically calling the engineer's attention to the fact that the brake pipe and brake system of the train needs recharging so as to obviate the above possibility.

In the No. 24RL locomotive brake equipment disclosed in Westinghouse Air Brake Company's instruction pamphlet No. 5066 dated March 1948 there is disclosed an engineer's brake valve device embodying a brake pipe maintaining valve device controlled by the opposing pressures in the brake pipe and the usual equalizing reservoir for supplying fluid under pressure to the brake pipe to compensate for brake pipe leakage and thereby maintain brake pipe pressure substantially equal to that in said reservoir. This maintaining valve is effective in a first service position of the brake valve device in which the pressure of fluid in the equalizing reservoir is reduced into the limited volume of a reduction limiting reservoir at a service rate and thence to atmosphere at a much slower rate through a fading maintaining choke. The reduction in equalizing reservoir pressure effected by substantial equalization into the reduction limiting reservoir is such as to effect quick service operation of AB valves and in turn a light slack gathering application of brakes on a train, while the continued reduction through the fading choke is to so limit supply of fluid under pressure to the brake pipe by operation of the maintaining valve as to prevent brake pipe pressure at the rear of a train increasing by flow of fluid under pressure from the front end sufficient to operate the AB valves to cause the brakes to release, as will otherwise occur if a brake application is initiated before a train is fully charged at which time a so-called false pressure gradient exists in the brake pipe. According to the invention this same maintaining valve which provides fading maintaining in first service position of the engineer's brake valve device is also employed to provide flat maintaining in the usual service and lap positions of said brake valve device as necessary for control of a train down a grade.

Associated with the brake valve device disclosed in the above referred to instruction pamphlet is an application valve device having a normal position opening communication from the reduction limiting reservoir to atmosphere through the fading choke. The application valve device is automatically movable to an application position in case of incapacity of the engineer, exceeding a speed limit or the like to effect a reduction in pressure in the equalizing reservoir and thereby in the brake pipe to cause an application of train brakes. If the brake valve device is allowed to remain in running position when the application valve device moves to application position a complete venting of fluid under pressure from the equalizing reservoir and thereby the brake pipe will occur. This is unnecessary since a full service application of brakes will be obtained upon a full service reduction in pressure in the equalizing reservoir and brake pipe. Hence, if the engineer is alert he may move his brake valve device to lap position for limiting the reduction in pressure in the equalizing reservoir to the usual full service degree and thereby prevent unnecessary loss of fluid under pressure from said reservoir and the brake pipe. It is to be noted, however, that, according to the invention, fluid under pressure is supplied to the maintaining valve in lap position, and it is not desired to maintain brake pipe pressure against leakage when an automatic application of brakes is effected and the brake valve is moved to lap position, such as above described, since leakage of fluid under pressure from any brake equipment in a train might result in the maintained brake pipe pressure causing operation of said equipment to release the brakes on the respective car, under a condition where positive braking of all cars in a train must be assured.

Another object of the invention is therefore the provision of means for preventing supply of fluid under pressure to the brake pipe to maintain the pressure therein against leakage in case of an automatic application of brakes when the brake valve device is moved to lap position.

Another object of the invention is the provision of a locomotive brake equipment embodying means for providing fading maintenance of brake pipe pressure against leakage upon initiating an application of brakes for ensuring a light slack gathering application of brakes, flat maintaining of brake pipe pressure against leakage for use in descending grades or whenever fading maintenance is not required and for cutting out all brake pipe maintenance upon effecting a protective application of brakes such as resulting from exceeding a speed limit, incapacity of the engineer or the like.

Still another object of the invention is the provision of means adapted to be applied to the engineer's automatic brake valve device of the 24RL locomotive brake equipment, without any modification thereof, for accomplishing the above objects.

Other objects and advantages will become apparent from the following more detailed description of the invention.

Figure 2:
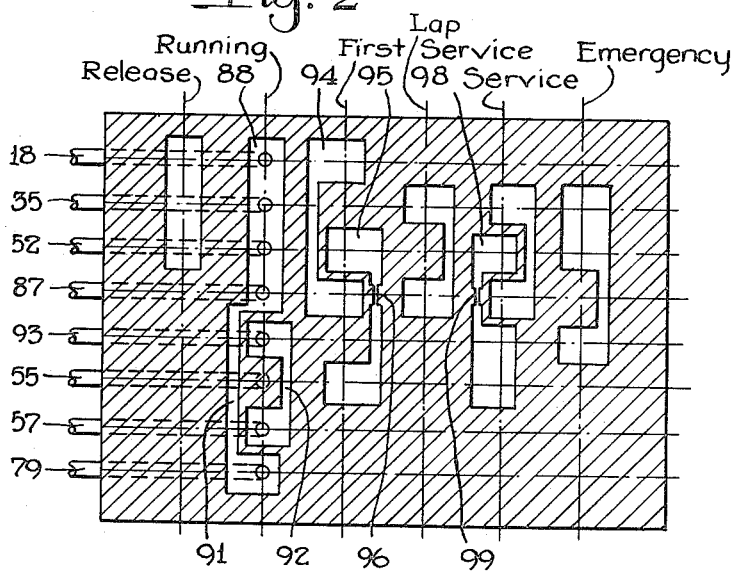
Figure 3:
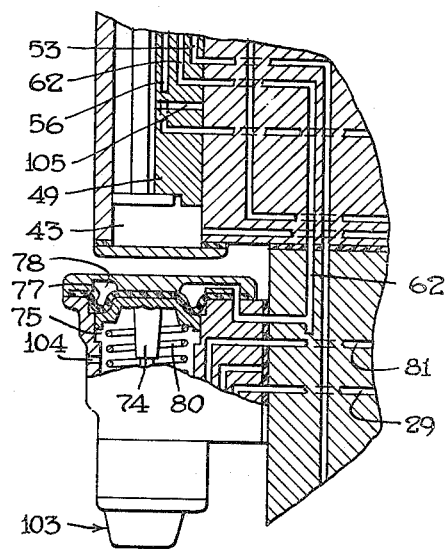

In the accompanying drawings; Fig. 1 is a diagrammatic view of a portion of a locomotive brake equipment embodying the invention; Fig. 2 is a development diagram of the rotary valve and seat of the brake valve device shown in Fig. 1; and Fig. 3 is a diagrammatic view of a modification of the invention.

*Description—Figs. 1 and 2*

As shown in Fig. 1 of the drawing, the locomotive brake apparatus, except for the invention, may be like that shown in the instruction pamphlet above referred to in view of which only such parts are shown in the drawing as considered necessary to a clear understanding of the invention, said apparatus comprising an engineer's automatic brake valve device 1, a main reservoir fluid pressure supply pipe 2, a brake pipe 3, an equalizing reservoir 4, a reduction limiting reservoir 5, and a suppression reservoir 6 employed in the equipment disclosed in the above referred to pamphlet in connection with safety control and automatic train control apparatus and appropriated, according to the invention, for use as a control pressure volume, as will be later brought out.

The brake valve device 1 is of the usual built-up structure comprising a base or pipe bracket 7 upon which there are mounted in the following order, casing sections 8, 9, 10, a rotary valve seat member 11 and a cover 12 all being secured together in the usual manner. Contained within a chamber 13 in the cover 12 and mounted to turn on a seat on the adjacent face of member 11 is a rotary valve 14 connected by the usual key 15 to an operating handle 16 disposed above the cover 12. The handle 16 and thereby the rotary valve 14 have the usual release, running, first service, lap, service and emergency positions, as indicated by legends in Fig. 2, the release and emergency positions not being pertinent to the invention and no further mention will therefore be made of them.

The casing section 9 constitutes, according to the invention, a new section for the brake valve device for reasons which will hereinafter be brought out.

The pipe bracket 7 carries a feed valve device 17 adapted to supply fluid from the main reservoir pipe 2 to a passage 18 at the usual reduced pressure desired to be carried in the brake pipe 3, the passage 18 extending through the several casing sections and being open to the rotary valve chamber 13 whereby said chamber will be constantly supplied with fluid at feed valve pressure.

Carried by the casing section 8 is a combined equalizing brake pipe discharge and maintaining valve device 89 comprising an equalizing piston 19 at one side of which is a chamber 20 open to a passage 90 connected to the equalizing reservoir 4. At the opposite side is a chamber 21 open to a passage 22 connected to the brake pipe 3 and to a brake pipe cut-off valve device 23 associated with the casing section 10. The piston 19 is connected to the end of one arm of a bell crank 24 the other arm of which is connected to a brake pipe discharge valve 25 arranged to control communication between chamber 21, and thereby the brake pipe 3, and an atmospheric vent passage 26. A maintaining valve 27 contained in a chamber 28 which is open to a passage 29 in the casing section 8 controls communication between said chamber and the brake pipe chamber 21 and has a stem 30 extending into chamber 21 for engagement by the arm of bell crank 24 connected to piston 19. With piston 19 in the position in which it is shown in the drawing the exhaust valve 25 is adapted to be seated by a spring 31 while the maintaining valve 27 is adapted to be seated by a spring 32. When pressure of fluid in chamber 20 is lower than that in chamber 21, the piston 19 is adapted to move toward the left hand to unseat the discharge valve 25, while when pressure in chamber 21 is lower than that in chamber 20 said piston is adapted to move toward the right hand to unseat the maintaining valve 27.

The cut-off valve device 23 associated with the casing section 10 comprises a valve 33 arranged to cooperate with a seat 34 to control a brake pipe charging communication between a passage 35 connected to the seat of rotary valve 14 and the brake pipe passage 22. The valve 33 is connected by a stem 36 to a piston 37 subject on one side to brake pipe pressure from passage 22 and on the opposite side to pressure of fluid in a chamber 38 plus the pressure of a spring 39, chamber 38 being connected to a passage 40.

Also associated with the casing section 10 is an automatic brake application valve device 41 comprising a piston 42 at one side of which is a valve chamber 43 constantly supplied with fluid under pressure from the main reservoir pipe 2 while at the opposite side is a chamber 44 adapted to be charged with fluid under pressure from valve chamber 43 via a small port 45 through the piston and open via a passage 46 to a pipe 47 which is normally closed but adapted to be vented upon incapacitation of an engineer, exceeding a speed limit or the like. With the end of pipe 47 closed, pressure of fluid therein and in piston chamber 44 will equalize with that in valve chamber 43 to permit a spring 48 in chamber 47 to move piston 42 and a connected slide valve 49 in the latter chamber to a normal position in which these parts are shown in the drawing. Upon venting of fluid under pressure from pipe 47 and piston chamber 44 pressure of fluid in chamber 43 will move piston 42 and slide valve 49 to an automatic brake application position defined by sealing contact of said piston with a gasket 50.

In the normal position of the application slide valve 49 a cavity 51 therein opens the equalizing reservoir passage 90 to a passage 52 connected to the seat of the rotary valve 14, while a passage 53 in said valve connects passages 35 and 40 to permit equalization of pressures of fluid on opposite sides of the cut-off valve piston 37 whereby spring 39 will hold the cut-off valve 33 open.

The reduction limiting reservoir 5 is connected by a passage 54 to the seat of the application slide valve 49 and also by passages 54 and 55 directly to the seat of rotary valve 14. In normal position of the application slide valve 49 a passage 56 therein opens passage 54 to a passage 57 connected to the seat of the rotary valve 14, the passage 56 being also open through a fading maintaining choke 58 to a cavity 59 in said slide valve which cavity registers with an atmospheric vent passage 60. In the normal position of slide valve 49 a locomotive sanding pipe 61 is also vented via a casing passage 62, a passage 63 in said slide valve and the cavity 59.

The casing section 9 added to the brake valve device in accordance with the invention is provided with vertically extending passages for connecting heretofore registering passages in pipe bracket 7 and the casing section 10. On one side of the casing section 9 there is mounted a brake pipe maintaining cut-off valve device 64 which comprises a casing having a chamber 65 open to passage 29 leading to the maintaining valve chamber 28. A valve 66 contained in chamber 65 is provided on one end of a plunger 67 slidably mounted in said casing, said valve controlling communication between said chamber and an annular chamber 68 provided in the exterior of said plunger beneath said valve. Chamber 68 is open through a passage 69 to a signal device which may be in the form of an air whistle 70. A spring 71 in chamber 65 urges valve 66 to its seat.

The valve 66 and plunger 67 are provided with an axially extending bore 71 connecting chamber 65 to a chamber 72 containing a valve 73 arranged to cooperate with a seat on the end of said plunger around said bore for closing communication between said chambers. The valve 73 is connected to one end of a stem 74 which extends through a bore in sliding contact with the wall thereof provided in a partition wall 75a separating chamber 72 from a chamber 75. In chamber 75 the stem 74 terminates in a follower head 76 engaging one side of a flexible diaphragm 77 at the opposite side of which is a chamber 78 open to a passage 79 connected to the suppression reservoir 6 and to the seat of the rotary valve 14. Chamber 75 is open to passage 90 and the equalizing reservoir 4 and contains a spring 80 acting through follower 76 on diaphragm 77 with a chosen force.

The valve chamber 72 is open through a passage 81 to a casing bore 82. The bore 82 is open to a parallel arranged casing bore 83 through a passage 84 both of said bores opening at one end to the exterior of the casing section and being closed by plugs 85, respectively. The opposite ends of bores 82, 83 are screw-threaded to receive a plug 86 and are connected respectively to the main reservoir pipe 2 and a passage 87 connected to the seat of rotary valve 14, the plug 86 being shown in the bore 83 closing communication between passage 87 and the maintaining valve passage 81 which is thereby open to the main reservoir pipe 2. If desired, the plug 86 may be transferred to bore 82 for closing communication between main reservoir pipe 2 and passage 81 whereby the latter passage will be open to passage 87.

In running position of the rotary valve 14, a cavity 88 therein opens the rotary valve chamber 13 to passages 35, 52 and 87 whereby fluid at feed valve pressure from said chamber will flow to said passages. With the application slide valve 49 in normal position, fluid under pressure supplied to passage 35 will flow to the brake pipe cut-off valve device 23 and also through cavity 53 in said slide valve and passage 40 to piston chamber 38 in said device whereby spring 39 will open the cut-off valve 33 to permit flow of fluid under pressure from passage 35 to passage 22 and thence to chamber 21 in the equalizing device 89 and to the brake pipe 3 whereby said chamber and brake pipe will become charged with fluid at the pressure desired to be normally carried in said brake pipe as supplied by the feed valve device. At the same time fluid under pressure supplied to passage 52 will flow through cavity 51 in slide valve 49 to passage 90 and thence to the equalizing reservoir 4 and equalizing piston chamber 20 charging same to the same pressure as in brake pipe 3. With chambers 20, 21 at opposite sides of the equalizing piston 19 thus charged with fluid at the same pressures, said piston will assume the position in which it is shown in the drawing with the brake pipe discharge valve 25 and maintaining valve 27 both closed by their respective springs 31 and 32.

Fluid under pressure supplied to passage 87 is blocked from flow therefrom by plug 86 positioned as above described. Fluid at feed valve pressure from the rotary valve cavity 88 will also flow through a passage 91 in the rotary valve to passage 79 and thence to the suppression reservoir 6 and diaphragm chamber 78 in the maintaining cut-off valve device 64. Fluid at the same pressure provided through passage 90 in the equalizing reservoir 4 also becomes effective in chamber 75 of the cut-off valve device 64. With the pressure of fluid in chambers 78 and 75 thus equal spring 80 will hold the diaphragm 77, stem 74 and valve 73 in the position in which they are shown in the drawing permitting closing of valve 66 by spring 71 without seating of valve 73. With valve 73 thus unseated fluid under pressure from the main reservoir pipe 2 will flow through the casing bore 82 to passage 81 and thence past said valve to chamber 65 and through passage 29 to the maintaining valve chamber 28.

Also in running position of the rotary valve 14, a passage 92 therein opens the reduction limiting reservoir 5 to atmosphere via passage 54, passage 56 in the application slide valve 49 when in normal position, passage 57, said passage 92 and an atmospheric passage 93. Passage 55 from the reduction limiting reservoir is lapped by the rotary valve 14 in running position.

With the brake equipment charged with fluid under pressure as just described, if it is desired to effect a light slack gathering application of brakes on a train, the brake valve handle 16 and thereby the rotary valve 14 will be turned to first service position. In this position passage 35 is lapped by the rotary valve to cut off further supply of fluid under pressure to the brake pipe 3, and passages 57 and 79 are also lapped by said valve, the lapping of passage 57 closing the vent from the reduction limiting reservoir 5 via the atmospheric passage 93 while the lapping of passage 79 bottles up the fluid under pressure in the reservoir 6 and diaphragm chamber 78 of the maintaining cut-off valve device 64. In this position of the rotary valve 14, passage 87 remains connected to the feed valve passage 18 via cavity 94 in said valve, and the equalizing reservoir 4 and equalizing piston chamber 20 are connected via passage 90, cavity 51 in the application slide valve 49, passage 52, a cavity 95 containing a service choke 96 in the rotary valve 14 to passage 55 and thereby to the reduction limiting reservoir 5 whereupon fluid under pressure in said equalizing reservoir will reduce to substantial equalization into said reduction limiting reservoir at a service rate governed by said choke.

As the pressure of fluid in the equalizing reservoir 4 is reduced as just described, the pressure in equalizing piston chamber 20 correspondingly reduces and if leakage of fluid under pressure from brake pipe 3 is insufficient to reduce pressure in said brake pipe and in equalizing piston chamber as fast, then when equalizing reservoir pressure in chamber 20 becomes reduced sufficiently below brake pipe pressure in chamber 21, the equalizing piston 19 will move toward the lower pressure to open the discharge valve 25 for venting fluid under pressure from said brake pipe via atmospheric passage 26. If leakage of fluid under pressure from the brake pipe 3 is such or in case of a false gradient existing in the brake pipe at the time of moving the brake valve device to first service position and cutting off supply of fluid under pressure to said brake pipe that the pressure in the brake pipe at the locomotive tends to reduce by flow toward the rear of the train at a rate exceeding the rate of reduction in equalizing reservoir pressure, then as soon as brake pipe pressure in chamber 21 becomes reduced sufficiently below that in chamber 20, the equalizing piston 19 will operate to open the maintaining valve 27 to supply fluid under pressure from the main reservoir pipe 2 to the brake pipe 3 at a rate sufficient to prevent brake pipe pressure reducing faster than the service rate of reduction in pressure in the equalizing reservoir.

The reduction limiting reservoir 5 is of such volume with respect to the volume of the equalizing reservoir 4 that substantial equalization of pressure in said reservoirs will produce approximately a six pound reduction in pressure in the equalizing reservoir and the resulting operation of the equalizing valve device 89 will cause or permit a like reduction in pressure in the brake pipe 3 which is sufficient to cause usual quick service operation of the well-known AB valves employed on freight cars to effect a light slack gathering application of the brakes on a train.

It is to be noted however that with the application slide valve 49 in normal position the reduction limiting reservoir 5 is open to atmosphere via passage 54, the fading maintaining choke 58, cavity 59 and passage 60 so that after substantial equalization of pressure in the equalizing reservoir 4 into said reduction limiting reservoir, the pressure of fluid in said equalizing reservoir will continue to reduce at a very slow rate controlled by said fading choke. As a result, piston 19 in the equalizing device 89 will adjust either the brake pipe discharge valve 25 or maintaining valve 27 to cause or permit pressure in the brake pipe 3 to reduce at a corresponding rate. This fading choke is necessary only to limit the amount of fluid under pressure supplied to the brake pipe, in case a false gradient exists at the time of initiating an application of brakes, as to prevent such an increase in brake pipe pressure, following the AB valve quick service venting of fluid under pressure from the brake pipe, as to cause operation of the AB valves to release brakes, as will otherwise occur on all cars of a train except for a few at the head end of a train.

After the slack in a train has been gathered by use of first service position of the brake valve device, the brake valve handle 16 and thereby rotary valve 14 may be turned to service position for opening the equalizing reservoir 4 directly to the exhaust passage 93 through a passage 98 containing a service choke 99 to thereby effect, in the usual manner, a further reduction in pressure in said equalizing reservoir as necessary to obtain a desired braking of a train. When the equalizing reservoir pressure is thus reduced to a desired low degree, the brake valve handle 16 and rotary valve 14 will be turned to the usual lap position for bottling up the fluid remaining in the equalizing reservoir 4.

The equalizing device 89 will operate as before described in response to movement of the rotary valve 14 to service position and then lap position to cause or permit a further reduction in pressure in the brake pipe of a like degree and in case of leakage of fluid under pressure from the brake pipe, the pressure therein will be held substantially equal to that in the equalizing reservoir 4 by the maintaining valve 27 supplying fluid under pressure from the main reservoir pipe 2 to the brake pipe to compensate for brake pipe leakage as will be clear from the above description. By compensating for leakage of fluid under pressure from the brake pipe 3 the pressure of fluid therein will remain substantially constant and leakage will be prevented from increasing the application of brakes on a train above a desired degree.

In controlling a train down a grade the brakes on the train will be initially applied by operation of the brake valve device 1 as above described and then remain applied with the chosen degree of force until the engineer desires a change in the degree of application. If it becomes desirable to increase the application he will move the brake valve device to service position until the desired increase in degree of brake application is obtained and then back to lap position where, due to operation of the maintaining valve 27 the application will remain at the desired increased degree. On the other hand, if it becomes necessary to reduce the degree of brake application, the engineer will return the brake valve handle to release position and then possibly to running position for recharging the brake system during which time with the AB valves on the car of the train in their release position, the application of brakes on the cars will reduce to the setting of the usual pressure retaining valve devices. Then after the train system is sufficiently recharged he will move the brake valve device to first service position or directly to service position to effect a reapplication of brakes to the desired reduced degree and then to lap position to hold the application at such degree.

It will be noted that the fluid supplied to the brake pipe 3 by the maintaining valve 27 to compensate for leakage is obtained from the main reservoir pipe 2 via the maintaining cut-off valve device 64. It will be further noted that with the brake valve device out of running position the fluid in reservoir 6 and diaphragm chamber 78 of the cut-off valve device 64 is bottled up and at a pressure equal to that provided in the brake pipe 3 in running position of the brake valve device, while that in chamber 75 reduces with and is always equal to that in the equalizing reservoir 4. By successively effecting reductions in pressure in the equalizing reservoir 4 to cause successive increases in braking of a train it is possible for an engineer to so reduce the pressure in the brake system as to prevent obtaining a further service application in case of necessity. Therefore, as soon as the equalizing reservoir pressure acting in chamber 75 of the maintaining cut-off valve device 64 becomes reduced to a pressure where little further service application of brakes may be obtained, the pressure of the bottled up fluid in chamber 78 will deflect diaphragm 77 against spring 80 and close valve 73 and open valve 66. This may occur just before obtaining a full service reduction in pressure in the equalizing reservoir 4, that is, upon possibly an eighteen pound reduction below a normal seventy pounds carried in the brake pipe and acting in diaphragm chamber 78 or at any other desired reduction in pressure in the equalizing reservoir below that normally carried in the brake pipe.

The closing of valve 73 prevents further supply of fluid under pressure from the main reservoir pipe 2 to the maintaining valve chamber 28 so there will be no further compensating for brake pipe leakage, while the opening of valve 66 connects the maintaining valve chamber 28 to the whistle 70. With the maintaining valve 27 open to permit supply of fluid under pressure to the brake pipe 3 to compensate for leakage, fluid under pressure from the brake pipe will then flow past said valve to whistle 70 and operate same to call the engineer's attention to the reduced pressure condition of the fluid in the brake pipe so that, while there is still time, he may recharge his brake system and then reapply the brakes to insure the safety of the train.

It will be noted that when the maintaining cut-out valve device 64 is in the position occupied in the drawing, the placing of plug 86 in the casing bore 83, as shown in the drawing, provides a constant supply of fluid under pressure to the maintaining valve chamber 27 for maintaining brake pipe pressure against leakage in first service, service and lap positions whereby fading maintaining is obtainable in first service position and flat maintaining is obtainable in service and lap positions. If flat maintaining in service and lap positions of the brake valve device is not desired then the plug 86 may be removed from the casing bore 83 and placed in the bottom of the casing bore 82. This will close off supply of fluid under pressure from the main reservoir pipe 2 to the maintaining valve chamber 28 and open said chamber to passage 87 which is supplied with fluid under pressure from the feed valve passage 18 only in running position of the brake valve rotary valve 14 via cavity 88 therein, as before described, and in first service position via passage 94 in said rotary valve whereby only fading maintaining will be provided in the first service position as in the structure disclosed in the instruction pamphlet above referred to.

Now assume that with the brake valve rotary valve 14 in running position, fluid under pressure is vented from pipe 47 and thereby piston chamber 44 in the application valve device 41 by incapacitation of the engineer, exceeding a speed limit or the like. As a result, pressure of fluid in valve chamber 43 acting on piston 42 will move said piston and slide valve 49 to their upper, automatic application position.

In the application position of slide valve 49 chamber 38 in the brake pipe cut-off valve device 23 will be vented to atmosphere via casing passage 40, passage 63 in said slide valve, cavity 59 and atmospheric passage 60 whereupon brake pipe pressure acting on the opposite face of piston 37 will actuate same to seat valve 33 and cut off further supply of fluid under pressure to the brake pipe. At the same time, the equalizing reservoir passage 90 will be connected through cavity 51 in slide valve 49 and a service port 100 and cavity 101 therein to passage 54 and also to a passage 102. Fluid under pressure in the equalizing reservoir 4 and equalizing piston chamber 20 will then reduce into the reduction limiting reservoir 5 and cause operation of the equalizing device 89 to initiate an application of brakes the same as before described. After a certain lapse of time necessary for gentle gathering of slack in a train, means (not shown) will operate to continue the reduction in equalizing reservoir pressure through passage 102. If the brake valve device is moved to lap position, the such reduction will continue until a full service reduction is obtained to effect a corresponding reduction in pressure in brake pipe 3 and thereby a corresponding application of brakes on the train to ensure stopping thereof.

With the plug 86 in the position in which it is shown in the drawing providing for flow of fluid under pressure from the main reservoir pipe 2 through the cut-off valve device 64 to the maintaining valve chamber 28 it will be noted that if the maintaining valve 27 opens while reducing pressure of fluid in the equalizing reservoir that brake pipe leakage will be compensated for. However, as soon as the pressure in the equalizing reservoir 4 acting in chamber 75 of the cut-off valve device becomes reduced, for instance, the eighteen pounds, before mentioned, below the bottled up pressure in chamber 78, the cut-off valve device 64 will operate as before described to prevent further supply of fluid under pressure to the brake pipe and hence further compensation for brake pipe leakage. Therefore, after an automatic application of brakes has been effected, if there is brake pipe leakage the pressure of fluid in the brake pipe will reduce to ensure that brake controlling valve devices on a train will remain in their application position to hold the brakes on the train applied.

If desired this cutting out of brake pipe maintenance may be caused to take place immediately in response to movement of the application slide valve 49 to its automatic application position by a structure such as shown in Fig. 3.

In Fig. 3, 103 designates a maintaining cut-off valve device arranged to control communication through which fluid under pressure is supplied to the maintaining valve chamber 27, as in the structure shown in Fig. 1, said valve device being like that shown in Fig. 1 structurally, except that chamber 75 is open to atmosphere via a vent 104 and chamber 78 is open to passage 62. When the application slide valve 49 is in its normal position passage 62 and thereby diaphragm chamber 78 is vented via passage 63 and cavity 59 in said slide valve and thence through the atmospheric passage 60, whereby the parts of the cut-off valve device 103 will assume the position in which they are shown in Fig. 1 to permit supply of fluid under pressure to the maintaining valve chamber 27 in order to provide for maintenance of brake pipe pressure against leakage upon movement of the brake valve rotary valve 14 to its different positions, the same as above described. However, upon movement of the application slide valve 49 to application position passage 62 and diaphragm chamber 78 will be supplied with fluid under pressure from valve chamber 43 via a port 105 in said slide valve. Fluid under pressure thus supplied to chamber 78 will deflect the diaphragm 77 against spring 80 and thus cut off supply of fluid under pressure to the maintaining valve chamber 27 immediately upon initiating the automatic application of brakes.

Summary

It will now be seen that I have provided means adapted to provide flat maintenance of brake pipe pressure against leakage in the usual service and lap positions of an engineer's brake valve device as particularly desirable for handling of trains down grades, and to provide fading maintenance against leakage in first service position of the brake valve device as necessary to ensure a light application of brakes on a train where a false brake pipe gradient is present at the time of initiating the application. By transfer of a plug the flat maintenance may be cut out, if such is desired, but fading maintaining in first service position will still be obtained. I have also provided means operative automatically to signal the engineer in case of undue depletion of pressure of fluid in the brake pipe when flat maintenance is employed and for cutting out all brake pipe maintenance in case of an automatic application immediately or shortly after initiating such application. These improvements are all obtained by the use of a special filler piece adapted to be added to an engineer's brake valve device such as disclosed in the instruction pamphlet above referred to and without any modification of said brake valve device.

Having now described my invention, what I claim as new and desire to secure by Letters Patent, is:

1. In combination, a brake pipe, a source of fluid under pressure, a normally charged equalizing reservoir, a normally vented reduction limiting reservoir, an engineer's brake valve device comprising a rotary valve having a first service position for opening said equalizing reservoir to said reduction limiting reservoir and having another service position for venting fluid under pressure from said equalizing reservoir directly to atmosphere and having a lap position for bottling up fluid under pressure in said equalizing reservoir, a vent from said reduction limiting reservoir including a fading choke, a maintaining valve for opening a fluid pressure supply communication between said source of fluid under pressure and said brake pipe, an equalizing piston controlled by opposing pressures of fluid in said brake pipe and equalizing reservoir and operative in response to pressure in said brake pipe reducing below that in said equalizing reservoir in either of said service or lap positions to open said maintaining valve, a first passageway for conveying fluid under pressure to said maintaining valve for supply to said brake pipe, a second passageway open to said source of fluid under pressure, a third passageway open to the seat of said rotary valve and supplied through said rotary valve with fluid under pressure in said first service position but not in said other service position and said lap position, and means for selectively opening said first passageway to either said second or said third passageway while closing communication to the other.

2. In combination, a brake pipe, a main reservoir pipe, an engineer's brake valve device comprising a rotary valve contained in a chamber, a feed valve device for supplying fluid at reduced pressure from said main reservoir pipe to said chamber, an equalizing reservoir, a reduction limiting reservoir, a vent for said reduction limiting reservoir including a fading choke therein, an equalizing device comprising a brake pipe discharge valve, a brake pipe maintaining valve and a piston subject to opposing pressures of fluid in said equalizing reservoir and brake pipe and operative upon reducing pressure in said equalizing reservoir below that in said brake pipe to open said discharge valve for venting fluid under pressure from said brake pipe and operative in case pressure in said brake pipe reduces ahead of that in said equalizing reservoir to open said maintaining valve, said rotary valve having a first service position for opening said equalizing reservoir to said reduction limiting reservoir, another service position for venting fluid under pressure from said equalizing reservoir direct to atmosphere and having a lap position for bottling up fluid under pressure in said equalizing reservoir, a first passageway for conveying fluid under pressure to said maintaining valve for supply to said brake pipe upon opening of said maintaining valve, a second passageway constantly supplied with fluid under pressure from said main reservoir pipe, a third passageway open to the seat of said rotary valve, said rotary valve opening said third passageway to said feed valve device in said first service position but not in said other service position and said lap position, and means for selectively opening said first passageway to either said second or third passageways while closing communication with the other.

3. In combination, a brake pipe, a main reservoir pipe, an engineer's brake valve device comprising a plurality of casing sections mounted one on the other and including a rotary valve section, a rotary valve mounted in a chamber in said rotary valve section, a feed valve device mounted on one of said sections operative to supply fluid at reduced pressure from said main reservoir pipe to said chamber, a reduction limiting reservoir connected to the seat of said rotary valve, a vent including a fading choke for said reduction limiting reservoir, an equalizing device mounted on one of said sections comprising a brake pipe discharge valve, a maintaining valve for opening communication between a first passageway in the respective section and said brake pipe, and an equalizing piston subject opposingly to pressures in said brake pipe and equalizing reservoir and operative upon a reduction in pressure in said brake pipe below that in said equalizing reservoir to open said discharge valve for venting fluid under pressure from said brake pipe and operative to open said maintaining valve in case pressure of fluid in said brake pipe reduces below that in said equalizing reservoir, said rotary valve having a running position for supplying fluid under pressure from said feed valve device to said brake pipe and to said equalizing reservoir and being operative upon movement out of said running position to cut off such supply, said rotary valve having a first service position for supplying fluid under pressure to a second passageway and for opening said equalizing reservoir to said reduction limiting reservoir, another service position for cutting off supply of fluid under pressure to said second passageway and for venting fluid under pressure from said equalizing reservoir directly to atmosphere and a lap position for also blocking supply of fluid under pressure to said second passageway and for bottling up the fluid under pressure in said equalizing reservoir, the first named passageway being arranged for registry with the second named passageway, upon mounting the respective casing sections on each other, and another casing section interposed between those containing said passageways and having a third passageway open to said first passageway, a fourth passageway open to said second passageway and a fifth passageway open to said main reservoir pipe, and means for selectively opening said third passageway to either said fourth or fifth passageway while closing communication between said third passageway and the other.

4. In combination, a brake pipe, a feed valve device, an equalizing reservoir, an engineer's brake valve device movable to a position for venting fluid under pressure from said reservoir, an equalizing device comprising a brake pipe discharge valve for venting fluid under pressure from said brake pipe, a maintaining valve for supplying fluid under pressure to said brake pipe and an equalizing piston subject to opposing pressures in said equalizing reservoir and brake pipe and operative upon reducing pressure in said reservoir below that in said brake pipe to open said discharge valve and upon reducing pressure of fluid in said brake pipe below that in said reservoir to open said maintaining valve, and means operative upon a reduction in pressure in said reservoir to a chosen degree to close communication through which said maintaining valve supplies fluid under pressure to said brake pipe.

5. In combination, a brake pipe, a feed valve device, an equalizing reservoir, an engineer's brake valve device movable to a position for venting fluid under pressure from said reservoir, an equalizing device comprising a brake pipe discharge valve for venting fluid under pressure from said brake pipe, a maintaining valve for supplying fluid under pressure to said brake pipe and an equalizing piston subject to opposing pressures in said equalizing reservoir and brake pipe and operative upon reducing pressure in said reservoir below that in said brake pipe to open said discharge valve and upon reducing pressure of fluid in said brake pipe below that in said reservoir to open said maintaining valve, a valve for closing communication through which said maintaining valve is operative to supply fluid under pressure to said brake pipe, and a movable abutment subject opposingly to pressure of fluid in said equalizing reservoir and fluid at the pressure supplied by said feed valve device for operating said valve to close said communication upon a chosen reduction in pressure in said reservoir below that supplied by said feed valve device.

6. In combination, a brake pipe, a feed valve device, an equalizing reservoir, an engineer's brake valve device movable to a position for venting fluid under pressure from said reservoir, an equalizing device comprising a brake pipe discharge valve for venting fluid under pressure from said brake pipe, a maintaining valve for supplying fluid under pressure to said brake pipe and an equalizing piston subject to opposing pressures in said equalizing reservoir and brake pipe and operative upon reducing pressure in said reservoir below that in said brake pipe to open said discharge valve and upon reducing pressure of fluid in said brake pipe below that in said reservoir to open said maintaining valve, a signal device, and means operative upon a reduction in pressure in said reservoir to a chosen degree to close communication through which said maintaining valve is operative to supply fluid under pressure to said brake pipe and to also effect operation of said signal device.

7. In combination, a brake pipe, a feed valve device, an equalizing reservoir, an engineer's brake valve device movable to a position for venting fluid under pressure from said reservoir, an equalizing device comprising a brake pipe discharge valve for venting fluid under pressure from said brake pipe, a maintaining valve for supplying fluid under pressure to said brake pipe and an equalizing piston subject to opposing pressures in said equalizing reservoir and brake pipe and operative upon reducing pressure in said reservoir below that in said brake pipe to open said discharge valve and upon reducing pressure of fluid in said brake pipe below that in said reservoir to open said maintaining valve, a valve for closing communication through which said maintaining valve is operative to supply fluid under pressure to said brake pipe, a fluid pressure operated signal device, another valve for supplying fluid under pressure to actuate said signal device, and a movable abutment subject to pressure of fluid supplied by said feed valve device acting in opposition to pressure of fluid in said reservoir and operative upon a chosen reduction in the latter pressure relative to the former pressure to actuate both of said valves.

8. In combination, a brake pipe, an equalizing reservoir, a source of fluid under pressure and an engineer's brake valve device comprising a plurality of casing sections mounted one on the other and including a rotary valve seat section, a rotary valve mounted on said seat section and having a service position for venting fluid under pressure from said equalizing reservoir, another casing section, an equalizing mechanism associated with said other section comprising a discharge valve for venting fluid under pressure from said brake pipe, a maintaining valve for establishing a fluid pressure supply communication between said source of fluid under pressure and said brake pipe and an equalizing piston subject to pressure in said brake pipe acting in opposition to pressure of fluid in said reservoir and operable upon a reduction in pressure in said reservoir below that in said brake pipe to open said discharge valve and upon a reduction brake pipe pressure below that in said reservoir to open said maintaining valve, another casing section disposed between the above named casing sections, a valve in the last named casing section controlling said communication, a fluid pressure operated signal device, another valve controlling communication between said maintaining valve and signal device, and a movable abutment operative in response to a chosen degree of reduction in pressure in said equalizing reservoir to operate the first named valve to close the communication controlled thereby and the second named valve to open the communication it controls.

9. In combination, a brake pipe, an equalizing reservoir, an equalizing mechanism comprising a discharge valve for venting fluid under pressure from said brake pipe, a maintaining valve for supplying fluid under pressure to said brake pipe, an equalizing piston subject to pressure of fluid in said reservoir opposing pressure of fluid in said brake pipe and operative upon reducing of pressure in said brake pipe below that in said reservoir for opening said maintaining valve to establish a fluid pressure supply communication to said brake pipe and upon reducing pressure of fluid in said reservoir below that in said brake pipe to open said brake pipe discharge valve, an engineer's brake valve device for venting fluid under pressure from said equalizing reservoir, and automatic means responsive to a reduction in pressure of fluid to also vent fluid under pressure from said equalizing reservoir and at the same time effect closure of said communication.

10. In combination, a brake pipe, an equalizing reservoir, an equalizing mechanism comprising a discharge valve for venting fluid under pressure from said brake pipe, a maintaining valve for supplying fluid under pressure to said brake pipe, an equalizing piston subject to pressure of fluid in said reservoir opposing pressure of fluid in said brake pipe and operative upon reducing of pressure in said brake pipe below that in said reservoir for opening said maintaining valve to establish a fluid pressure supply communication to said brake pipe and upon reducing pressure of fluid in said reservoir below that in said brake pipe to open said brake pipe discharge valve, an engineer's brake valve device having a running position for supplying fluid under pressure to said brake pipe, to said equalizing reservoir and to said communication and a service position for also supplying fluid under pressure to said communication and for cutting off supply of fluid under pressure to said brake pipe and reservoir and venting fluid under pressure from said reservoir, an automatic means operative upon a reduction in pressure to close said communication and vent fluid under pressure from said equalizing reservoir.

11. In combination, a brake pipe, an equalizing reservoir, an equalizing mechanism comprising a discharge valve for venting fluid under pressure from said brake pipe, a maintaining valve for supplying fluid under pressure to said brake pipe, an equalizing piston subject to pressure of fluid in said reservoir opposing pressure of fluid in said brake pipe and operative upon reducing of pressure in said brake pipe below that in said reservoir for opening said maintaining valve to establish a fluid pressure supply communication to said brake pipe and upon reducing pressure of fluid in said reservoir below that in said brake pipe to open said brake pipe discharge valve, an engineer's brake valve device for venting fluid under pressure from said equalizing reservoir, automatic means movable from a normal position upon a reduction in pressure of fluid to also vent fluid under pressure from said equalizing reservoir, and valve means cooperative with said maintaining valve to control said communication and operative to a communication closing position in response to a chosen reduction in pressure of fluid in said reservoir.

12. In combination, a brake pipe, an equalizing reservoir, an equalizing mechanism comprising a discharge valve for venting fluid under pressure from said brake pipe, a maintaining valve for supplying fluid under pressure to said brake pipe, an equalizing piston subject to pressure of fluid in said reservoir opposing pressure of fluid in said brake pipe and operative upon reducing of pressure in said brake pipe below that in said reservoir for opening said maintaining valve to establish a fluid pressure supply communication to said brake pipe and upon reducing pressure of fluid in said reservoir below that in said brake pipe to open said brake pipe discharge valve, an engineer's brake valve device for venting fluid under pressure from said equalizing reservoir, automatic means movable from a normal position upon a reduction in pressure of fluid to also vent fluid under pressure from said equalizing reservoir, and valve means cooperative with said maintaining valve to control said communication and operable by fluid under pressure to a position for closing such communication and upon release of such fluid under pressure to a position for opening such communication, said automatic means upon movement from normal position supplying fluid under pressure to operate said valve means and in said normal position venting such fluid under pressure.

13. An engineer's brake valve device for use in a fluid pressure brake apparatus including a brake pipe, a source of fluid under pressure and an equalizing reservoir, comprising a plurality of casing sections mounted one on top of the other and including a rotary valve section having a rotary valve seat, a second section, an equalizing device carried by said second section controlled by opposing pressures in said brake pipe and reservoir and including a brake pipe maintaining valve and operative upon a reduction in pressure in said reservoir, in case pressure of fluid in said brake pipe reduces faster than in said reservoir, to unseat said maintaining valve for opening a fluid pressure supply communication from a chamber to said brake pipe, a passageway in said rotary valve section open at one end to said seat, a rotary valve on said seat having running, first service, lap and service positions and operative in said running and first service positions to supply fluid under pressure to said passageway and operative in said lap and service positions to prevent supply of fluid under pressure to said passageway, a passageway in said second section having one end aligned for registry with the opposite end of the first named passageway and also open to said chamber, and a third casing section interposed between the two above named casing sections closing communication between the first and second named passageways and having a passageway connecting the second named passageway directly to said source of fluid under pressure.

References Cited in the file of this patent

UNITED STATES PATENTS

| | | |
|---|---|---|
| 1,339,679 | Turner | May 11, 1920 |
| 1,588,825 | Vergan | June 15, 1926 |
| 1,711,899 | Mills | May 7, 1929 |
| 2,038,168 | Farmer | Apr. 21, 1936 |
| 2,322,042 | McClure | Jan. 15, 1943 |

OTHER REFERENCES

Instruction Pamphlet No. 5032–1, May 1935, Westinghouse A. B. Co., Plate 11, Pittsburgh, Pa.